United States Patent Office 3,475,160
Patented Oct. 28, 1969

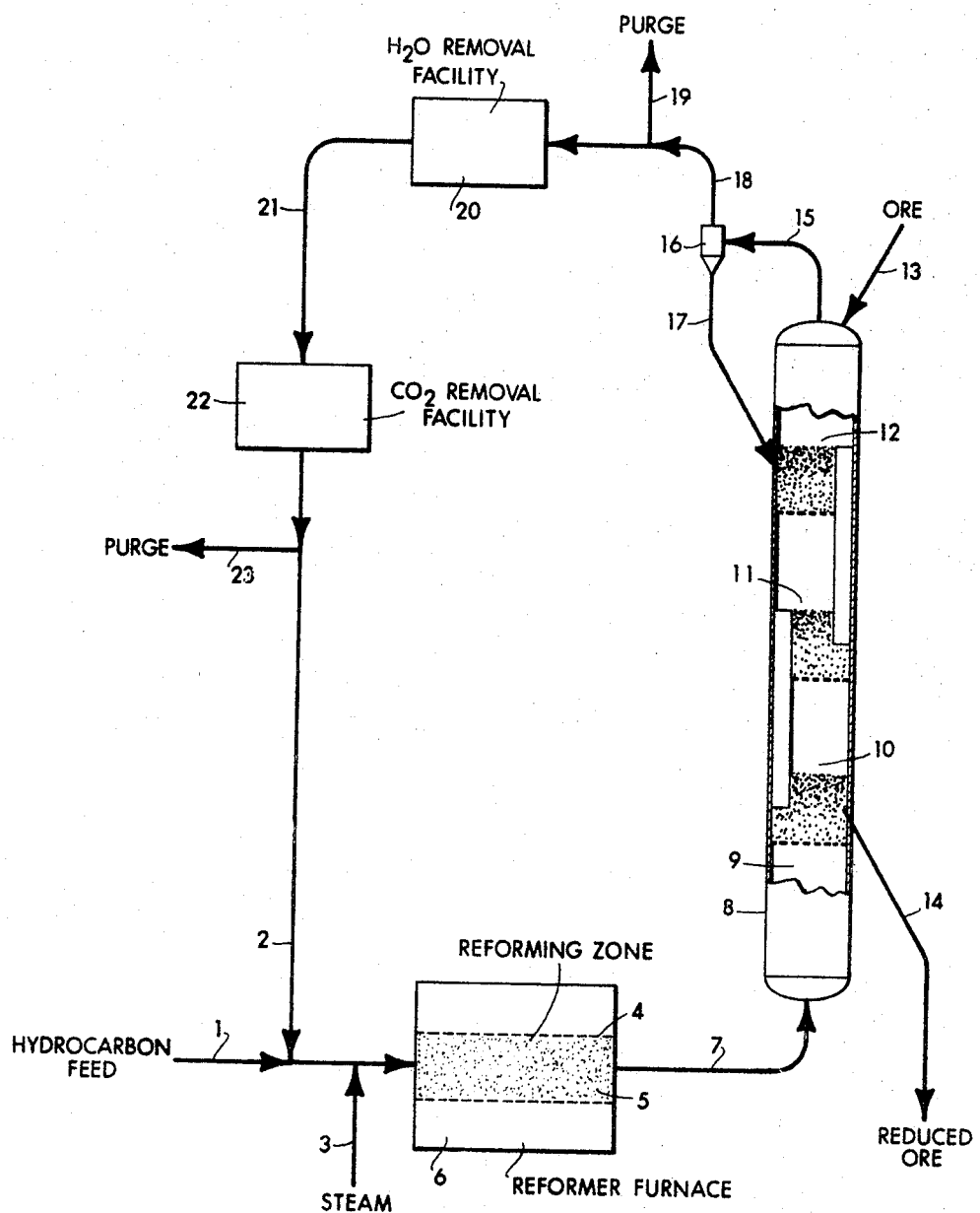

3,475,160
METHOD OF PRODUCING REDUCING GASES FOR THE FLUIDIZED BED REDUCTION OF ORES
Fred J. Heinzelmann, Fanwood, and Arthur L. Saxton, Warren, N.J., assignors to Esso Research and Engineering Company, a corporation of Delaware
Filed Feb. 15, 1967, Ser. No. 616,301
Int. Cl. C22b 5/12; C10j 1/20; C10q 35/06
U.S. Cl. 75—26                                    7 Claims

ABSTRACT OF THE DISCLOSURE

The manufacture or handling of carbon monoxide-containing reducing gases in contact with catalytic materials at certain temperatures may result in the decomposition of carbon monoxide and the erosion of the catalytic surfaces. These problems can be minimized by producing the reducing gas by reforming hydrocarbon with oxygen containing gases in a reforming zone at pressures above 50 p.s.i.g. and temperatures between 800° F. and 1700° F., wherein the atomic ratio of oxygen/carbon is about 0.5–1.3 and the atomic ratio of hydrogen/carbon is at least about 6.5. The invention is particularly useful in reducing ores with reducing gases wherein a portion of the reducing gases are recycled thru the reforming zone.

BACKGROUND OF THE INVENTION

This invention relates to the manufacture and handling of reducing gas. More particularly, it relates to reducing gases containing hydrogen and carbon monoxide prepared by the catalytic reforming of hydrocarbons with steam.

It is known to prepare reducing gas by reacting steam with light hydrocarbons, such as naphtha, natural gas, etc., in the presence of a reforming catalyst. A typical hydrocarbon feed is natural gas or methane which reacts, e.g., to form hydrogen and carbon monoxide, according to the endothermic reaction:

$$CH_4 + H_2O \rightarrow CO + 3H_2$$

The reaction takes place in the presence of any conventional reforming catalyst containing, e.g., nickel, chromium, molybdenum, cobalt or iron, at temperatures above about 800° F.

The hydrogen-rich reducing gases prepared by the steam reforming of hydrocarbons make excellent media for reducing oxidic ores. One highly advantageous such use of reformer gases is in the direct reduction of oxidic ores, e.g., the fluidized reduction of iron ore. In a typical iron ore reduction process, a reducing gas is introduced into a reduction reactor which consists of several stages of fluidized beds of ore. The gas ascends through the beds countercurrently to the descending fluidized ore. The ore, which is introduced at the top of the reactor, is progressively reduced substantially to metallic iron, which exits from the bottom or final reduction stage. Simultaneously with the reduction the reducing gas is at least partially oxidized to $CO_2$ and $H_2O$. Since it is desirable to carry out the reduction at elevated temperatures, it is necessary to preheat the reducing gases to temperatures ranging from about 1200–1700° F., or higher, before introducing them to the bottom of the reactor.

Since only a fraction of the available hydrogen and carbon monoxide is generally oxidized in a single pass through an ore reduction reactor, it is extremely desirable to recover the remainder for reuse. In order to recycle or reuse the unoxidized portion, however, it is necessary to remove the oxidized product, i.e., carbon dioxide and water, to regenerate the gas. The removal of water is usually accomplished by cooling the recycle gas to temperatures below about 200° F. This wastes much valuable sensible heat in the gas since it is necessary to reheat the regenerated gas before it can be introduced into the reduction reactor.

There are profound disadvantages inherent in this method of operation. Aside from the added expense of the increased thermal requirements, the necessity for cooling the recycle gas to low temperatures makes it necessary to provide a reheat furnace which involves a very large capital investment. Moreover, heating carbon monoxide-containing gases to such high temperatures can present other serious problems. For example, when heated through certain ranges of temperatures while in contact with catalytic materials such as nickel or ferrous metals, carbon monoxide undergoes a reversion reaction to carbon and carbon dioxide:

$$2CO \rightarrow C + CO_2$$

The exact temperature range in which any given gas undergoes reversion depends, among other things, on the carbon monoxide and carbon dioxide concentrations and system pressure. Generally, however, in the gas concentration and pressure ranges conventionally employed in reducing gas heating facilities, serious carbon deposition problems are only encountered at temperatures ranging from about 900° F. to about 1500° F., and particularly from about 900° F. to about 1300° F. At temperatures below about 900° F. reversion kinetics are so slow that carbon deposition is generally nil. At higher temperatures the equilibrium for the reversion reaction shifts so far to the left that reversion is encountered only at very high pressures or carbon monoxide concentrations.

Within the critical temperature range conducive to reversion for any given gas composition and pressure, however, the carbon monoxide in contact with, e.g., ferrous metal heat exchanger tubes, can liberate and deposit large quantities of free carbon, which can foul or plug the exchanger or the downstream process equipment.

Even worse, reactions may occur with the metal surfaces of the heat exchanger tubes or other equipment causing catastrophic carburization. This phenomenon often leads to severe corrosion, or metal dusting, which can be not only economically undesirable, but can also result in unsafe operating conditions, particularly at high pressures.

Handling recycle gases is not the only difficulty involved in using reducing gases in a fluidized ore reduction process. Serious problems are also encountered in the catalytic reformer itself. Thus, carbon monoxide reversion is a problem in the reformer at temperature below about 1300° F. At higher temperatures the cracking of hydrocarbons, e.g., for methane: $CH_4 \rightarrow C + 2H_2$, also results in carbon deposition. The carbon deposited either by carbon monoxide reversion or by hydrocarbon cracking kills the activity of the reforming catalyst when deposited on its surface.

It is known to avoid carbon deposition on reforming catalyst by employing a large excess above the stoichiometric steam requirements. Thus, e.g., with sufficient steam the water gas shift reaction, $H_2O + CO \rightarrow H_2 + CO_3$, is driven to the right in the low temperature range conducive ot CO reversion. The carbon monoxide concentration is lowered until the equilibrium is unfavorable for CO reversion and therefore no carbon is formed. As gas is passed further through the reformer higher temperatures are reached. In the high temperature zones of the reformer the equilibrium shifts back to the left to form additional carbon monoxide and $H_2O$.

While the use of excess steam avoids carbon deposition in the reformer, it introduces other serious problems.

Heat requirements for the process must be increased to provide for any large excesses over the stoichiometric steam requirements. Furthermore, the product gases from the reformer cannot be used in a fluidized iron ore reduction process without removing the excess $H_2O$. This is because the excess steam is oxidizing with respect to metallic iron at reduction temperatures, making it impossible to produce highly metallized iron products. In order to remove the excess steam, it is again necessary to cool the reformer product to condense the steam. This wastes much valuable sensible heat and also makes it necessary to reheat the carbon monoxide-rich gas, which results in the same problems which are encountered in the recycle gas system, i.e., carbon monoxide reversion.

These and other problems can be alleviated or even eliminated in accordance with this invention.

SUMMARY OF THE INVENTION

This invention contemplates a new and improved process for making reducing gas by catalytically reacting a hydrocarbon or mixture of hydrocarbons with steam in a reforming zone at pressures above about 50 p.s.i. while maintaining in the reforming zone an oxygen/carbon atomic ratio between about 0.5 and 1.3, preferably about 0.8 to 1.2, and a hydrogen/carbon atomic ratio above about 6.5, preferably about 8 to 12.

By carefully controlling these ratios within the contemplated range, high quality reducing gas can be prepared with little or no carbon deposition on the catalyst, and hence there is no necessity of using large quantities of excess steam to gasify carbonaceous deposits. Thus, the product from the reformer is suitable for direct use in an ore reduction process without the necessity of first cooling it to condense out excess water and then reheating it to reduction temperatures.

The hydrogen/carbon ratio can advantageously be controlled by adding hydrogen directly to the reforming zone or with the hydrocarbon feed. Sufficient hydrogen is added to provide the desired hydrogen/carbon ratio based on total hydrogen present, i.e., as steam, hydrocarbon and free hydrogen. Similarly, the oxygen/carbon ratio is controlled by adjusting the amount of steam fed to the reformer. In some cases it may be desirable to add free oxygen to produce certain reducing gas compositions and such oxygen must, of course, be taken into account in calculating the oxygen/carbon ratio.

Within the temperature range from about 800° F. to about 1500° F. any combination of the preferred oxygen/carbon ratio, i.e., 0.8 to 1.2, and the preferred hydrogen/carbon ratio, i.e., 8 to 12, results in an operable process. Successful operation can even be achieved at temperatures of about 1500–1700° F. by increasing either the oxygen/carbon or hydrogen/carbon ratio or both. Satisfactory reformer operation can also be achieved outside of the preferred oxygen/carbon and hydrogen/carbon ratios but within the broader ranges, i.e., 0.5 to 1.3 and above 6.5 respectively. Thus the use of a low oxygen/carbon ratio can be compensated for by using a high hydrogen/carbon ratio, and vice versa. For example, successful reforming is possible at a minimum oxygen/carbon ratio of 0.5 provided hydrogen/carbon ratios of about 12 or higher are used. Similarly, if minimum hydrogen/carbon ratios of about 6.5 are used it is necessary to use oxygen/carbon ratios above about 1.0.

Any hydrocarbon feed conventionally used in steam reforming can be used in accordance with this invention; however, it is particularly preferred to use feeds which are either primarily $CH_4$ such as natural gas or which are light hydrocarbons having average compositions ranging from about $CH_{2.5}$ to about $CH_{2.3}$ such as petroleum naphthas.

In one embodiment of this invention off-gas from a fluidized iron ore reduction reactor is recycled and used to provide hydrogen for the reformer. In this case the off-gas is first at least partially regenerated by removing all or part of the carbon dioxide formed in the ore reduction process, preferably at least 50% of the $CO_2$ being removed. Part of the $H_2O$ produced in the ore reduction process can also be removed by condensation. However, in a particularly preferred embodiment of this invention the recycle gas is recycled at high temperatures, i.e., without steam condensation, and the steam so recycled is used to make up part or all of the oxygen requirement needed to provide the desired oxygen/carbon ratio in the reformer. When the off-gas stream from the ore reduction reactor is cooled to low temperatures, e.g., below about 200° F., before recycling, the carbon dioxide can be removed by conventional scrubbing, e.g., with an amine or alkaline solution. If the off-gas is recycled at high temperatures the carbon dioxide content can be lowered by passing the gas through a solid absorbent, e.g., a bed of calcium oxide, silica gel, etc. The recycle stream should be recycled at as high a temperature as possible to maximize the process thermal efficiency and minimize the fuel required for heating the reformer to carry out the endothermic reforming reaction.

Before or after removal of carbon dioxide it may be desirable to purge a portion of the recycle stream to avoid a gradual buildup of any impurities which might be present. Generally, it is desirable to recycle to the reformer at least about 50% of the regenerated gas stream. Generally no more than about 4% $CO_2$ remains in the regenerated recycle stream when it is combined with the hydrocarbon feed. In any case, it is necessary in continuous operations to remove enough carbon, e.g., as $CO_2$, CO or $CH_4$, to equal that introduced into the system in the hydrocarbon feed. Similarly, it is necessary to remove enough oxygen, e.g., as $CO_2$, $H_2O$ or CO, to equal the oxygen removed from the metallic ore during reduction.

It may also be desirable in some instances to pass the recycle gas through a water gas shift reactor prior to carbon dioxide removal. In the shift reactor carbon monoxide and water are catalytically converted to carbon dioxide and hydrogen according to the reaction:

$$CO + H_2O \rightarrow H_2 + CO_2.$$

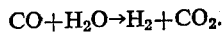

This enriches the recycle stream in hydrogen so that after $CO_2$ removal, the hydrogen/carbon ratio is enhanced. Conventional shift catalysts may be used effectively at temperatures ranging from about 400–900° F. and at both atmospheric and superatmospheric pressures. Additional steam can also be added to force the equilibrium to the right.

BRIEF DESCRIPTION OF THE DRAWING

The attached drawing shows an embodiment of the invention employed in combination with a direct ore reduction process.

DESCRIPTION OF THE PREFERRED EMBODIMENT

The invention will be better understood by reference to the following more detailed description and to the drawing.

Referring specifically to the drawing, a hydrocarbon feed is introduced via line 1 and joined by recycle stream 2 which contains, e.g., primarily carbon monoxide and hydrogen with minor parts of carbon dioxide and steam. The combined stream can then be mixed with additional steam if desired via inlet 3 before being injected into the reforming zone 4, which contains reforming catalyst 5. The reforming zone is heated to temperatures ranging from about 800° F. to about 1700° F. by means of reformer furnace 6. Within zone 4 the hydrocarbon is reformed with the steam to produce hydrogen and carbon monoxide, and the resulting high temperature, high quality reducing gas product exits from the reformer via line 7. The gas is then passed to the bottom 9 of a fluidized iron ore reduction reactor 8. The hot reducing gas ascends through fluidized beds of ore 10, 11 and 12, reducing the ore substantially to metallic iron, which is drawn off from the bottom fluid bed as a reduced ore product 14. The reducing gases are progressively cooled by the endothermic reduction reactions and exit from the top bed of the reactor via line 15 at lower temperatures ranging from about 800–1400° F. Fresh ore feed enters the top bed via line 13 and can be at ambient temperatures or can be preheated to higher temperatures to enhance the thermal efficiency of the process. The gases leaving the top of the reactor are separated from entrained solids in cyclone separator 16. The solids descend through standpipe 17 back into the top bed 12 of the reduction reactor. The gases leave separator 16 by means of outlet line 18 and are passed as a recycle stream to be used with the makeup hydrocarbon which is fed to the reformer. The recycle stream is adjusted in the steam content by means of the $H_2O$ removal facility 20 which can comprise any convenient method for removing $H_2O$ from a gaseous stream. Such facility can be merely a condenser to cool the recycle stream below its dew point, or more elaborate systems, such as absorbents, can be used, depending upon the temperature and conditions desired for the recycle stream. After water is removed, the recycle stream passes via line 21 into a $CO_2$ removal facility 22 where a major portion of the carbon dioxide is removed. A portion of the recycle stream can be withdrawn as purge gas at line 19 before regeneration or at line 23 after water and carbon dioxide removal has taken place. The regenerated recycle stream then is recombined via line 2 with the incoming hydrocarbon feed stream as previously described. The total amount of water and carbon dioxide removed in facilities 20 and 22 as well as by purging through lines 19 and 23, and the total amount of recycle returned to the reformer via line 2 is selected to provide the oxygen-to-carbon and hydrogen-to-carbon ratios required in accordance with this invention. These, of course, will vary depending upon the makeup of the hydrocarbon feed stream and the specific composition of the final reducing gas desired.

The following specific example will more clearly show the advantages achieved in accordance with this invention:

Apparatus is assembled as shown in the drawing of this application. A light petroleum naphtha having an average composition of $C_1H_{2.3}$ is preheated to about 800° F. and combined with steam and a recycle gas containing primarily hydrogen and carbon monoxide as described hereafter. The combined gaseous stream is introduced to a convention catalytic reformer with nickel catalyst at a pressure of about 180 p.s.i.g. The hydrocarbon is reformed with the steam to carbon monoxide and hydrogen and simultaneously heated through the temperature range from about 800–1600° F. The reformer product gas is fed directly to the bottom of a fluidized iron ore reduction reactor at about 1500° F. and 130 p.s.i.g. and has the following composition:

| | |
|---|---|
| CO | mole percent 13.9 |
| $H_2$ | do 69.7 |
| $CO_2$ | do 1.2 |
| $H_2O$ | do 7.0 |
| $CH_4$ | do 8.2 |
| H/C atomic ratio | 8 |
| O/C atomic ratio | 1 |

The reducing gas ascends through a series of fluid beds of iron ore reducing the ore substantially to metallic iron while simultaneously a substantial portion of the CO and $H_2$ is oxidized to carbon dioxide and water. After the removal from the reactor, the stream is partially cooled and compressed to the dew point to remove part of the moisture, leaving a sufficient amount to provide, in combination with the reformer feed, an O/C ratio of 1.0. The carbon dioxide in the recycle stream is removed by passing the gas at about 800° F. through a fluidized bed of calcium oxide particles.

After removal of most of the carbon dioxide and part of the water, the recycle gas is mixed with preheated feed hydrocarbon and fed to the reformer. The recycle stream, after carbon dioxide and water removal, has the following composition:

| | Mole percent |
|---|---|
| CO | 5.9 |
| $H_2$ | 61.9 |
| $CO_2$ | 1.2 |
| $H_2O$ | 20.9 |
| $CH_4$ | 10.1 |

The feed to the reformer is prepared by mixing recycle gas and makeup naphtha in the proportions of 8.3 moles of recycle gas per mole of carbon in the hydrocarbon feed, and the mixture is then reformed to make the reducing gas composition described heretofore.

After 100 hours of operation the process is shut down and the reformer is opened. Inspection shows essentially no carbon is deposited on the catalyst; nor is there any evidence of catastrophic carburization of the ferrous metal gas handling facilities and pipes.

In sharp contrast, a demonstration is conducted exactly as described above except that 0.86 mole of steam per mole of naphtha is added at line 3 and only 1.2 moles of the above recycle gas are mixed with each mole of feed. This provides an oxygen/carbon ratio of 1.0, but lowers the hydrogen/carbon ratio to only 4.0 in the reformed. After only 25 hours the reforming catalyst is substantially inactive and inspection shows it is heavily coated with carbon deposits.

In another demonstration the hydrogen/carbon ratio in the reformer is maintained at 6.5, but the oxygen/carbon ratio is increased to 2.0. While no carbon is deposited on the reforming catalyst, the resulting gases are of extremely low reducing power and when used in the fluidized iron ore reduction process exactly as described above, essentially none of the ore is reduced to metallic iron.

The reformer can also be successfully operated at pressures below 50 p.s.i.g. However, in such cases it is necessary to maintain still higher hydrogen/carbon ratios to avoid carbon deposition. Conventional reforming temperatures, catalysts and flow rates can be used in the reformer, and the invention is not intended to be limited to any particular set of conditions as regards these variables. Similarly, the manner of operation of an ore reduction process in combination with the reformer as described in accordance with this invention is not critical and any conventional reduction conditions can be employed, provided, of course, that some unoxidized reducing gas is available for use as recycle gas after passage through the ore reduction unit.

What is claimed is:

1. In an ore reduction process wherein hydrocarbon is fed to a reforming zone and reacted with oxygen-containing gas in the presence of a reforming catalyst at pressures above about 50 p.s.i.g. and at temperatures ranging from about 800° F. to about 1700° F. to form a reducing gas, at least a major portion of which is hydrogen and carbon monoxide, and wherein said reducing gas is passed countercurrently through a fluidized bed of oxidic ore at elevated temperatures to reduce the ore therein while simultaneously the reducing gas is partially oxidized to carbon dioxide and water, the improvement comprising
   (a) withdrawing the partially oxidized reducing gas from the bed of ore,
   (b) separating at least a portion of the carbon dioxide from the withdrawn gas, and
   (c) recycling a fraction of the remaining gas to said hydrocarbon reforming zone, said portion of carbon dioxide removed and said fraction of gas recycled being predetermined to provide in the reformer an oxygen/carbon atomic ratio of about 0.5 to 1.3 and a hydrogen/carbon atomic ratio of at least about 6.5.

2. The process of claim 1 wherein the separated portion of carbon dioxide comprises at least about 50% of the carbon dioxide in the withdrawn gas.

3. The process of claim 2 wherein the recycled fraction of gas comprises at least about 50 mole percent of said remaining gas.

4. The process of claim 3 wherein said oxygen/carbon atomic ratio is in the range from about 0.8 to 1.2 and the hydrogen/carbon atomic ratio is in the range from about 8 to 12.

5. The process of claim 1 wherein at least a major portion of said hydrocarbon is methane.

6. The process of claim 1 wherein at least a major portion of said hydrocarbon consists of a light naphtha having an average composition between about $CH_{2.5}$ and $CH_{2.3}$.

7. The process of claim 1 wherein the withdrawn partially oxidized reducing gas is contacted with a water gas shift catalyst under conditions conductive to the shifting of carbon monoxide and water to carbon dioxide and hydrogen, whereby said withdrawn gas is enriched in hydrogen.

References Cited
UNITED STATES PATENTS

| | | | |
|---|---|---|---|
| 1,645,968 | 10/1927 | Percy | 75—35 |
| 2,379,423 | 7/1945 | Cape | 75—35 |
| 2,585,737 | 2/1952 | Carpenter | 48—214 X |
| 2,971,752 | 2/1961 | Madaras. | |
| 3,375,099 | 3/1968 | Marshall | 75—35 |
| 3,379,505 | 4/1968 | Holmes et al. | |

L. DEWAYNE RUTLEDGE, Primary Examiner

HENRY W. TARRING II, Assistant Examiner

U.S. Cl. X.R.

23—212; 48—213, 214; 75—35; 252—373